US010476217B2

(12) United States Patent
Guillanton et al.

(10) Patent No.: US 10,476,217 B2
(45) Date of Patent: Nov. 12, 2019

(54) ELECTRICAL BUS BAR

(71) Applicant: Aptiv Technologies Limited, St. Michael (BB)

(72) Inventors: Melanie Guillanton, Epernon (FR); Christian Albertin, Chartres (FR); Sylvain Dion, Richebourg (FR); Francois Cormier, Dammarie sur Loing (FR)

(73) Assignee: APTIV TECHNOLOGIES LIMITED (BB)

( * ) Notice: Subject to any disclaimer, the term of this patent is extended or adjusted under 35 U.S.C. 154(b) by 0 days.

(21) Appl. No.: 16/207,091

(22) Filed: Dec. 1, 2018

(65) Prior Publication Data

US 2019/0181599 A1 Jun. 13, 2019

(30) Foreign Application Priority Data

Dec. 13, 2017 (EP) .................................... 17207129

(51) Int. Cl.
| | |
|---|---|
| *H01R 25/00* | (2006.01) |
| *H01R 25/16* | (2006.01) |
| *H01R 43/16* | (2006.01) |
| *H01R 13/03* | (2006.01) |
| *H01M 2/20* | (2006.01) |
| *H01R 13/11* | (2006.01) |

(52) U.S. Cl.
CPC .......... *H01R 25/162* (2013.01); *H01M 2/206* (2013.01); *H01R 13/03* (2013.01); *H01R 43/16* (2013.01); *H01R 13/111* (2013.01); *H01R 2201/26* (2013.01)

(58) Field of Classification Search
CPC .. H01R 25/162; H01R 2201/26; H01R 13/03; H01R 43/16; H01M 2/206; H01M 2/305; H01M 2/202; H01M 2/06
USPC ........................................................ 439/111
See application file for complete search history.

(56) References Cited

U.S. PATENT DOCUMENTS

| | | | |
|---|---|---|---|
| 9,324,986 B2 * | 4/2016 | Ahn ...................... | H01M 2/305 |
| 2006/0270286 A1 * | 11/2006 | Zhao ..................... | H01M 2/206 |
| | | | 439/840 |
| 2012/0100761 A1 * | 4/2012 | Große ................... | H01M 2/202 |
| | | | 439/774 |

(Continued)

FOREIGN PATENT DOCUMENTS

| | | |
|---|---|---|
| CA | 892781 A | 2/1972 |
| DE | 102011076624 A1 | 11/2012 |

*Primary Examiner* — Jean F Duverne
(74) *Attorney, Agent, or Firm* — Robert J. Myers (57) ABSTRACT

An electrical bus bar comprising: a first mounting portion configured to be connected to a first counter connector, a second mounting portion configured to be connected to a second counter connector and a flexible section between the first and second mounting portions, wherein the bus bar comprises a first flat part and a second flat part, wherein each flat part extends from the first mounting portion to the second mounting portion and is arranged in a stacked configuration, wherein the first flat part and the second flat part is made of a sheet metal, wherein a first strip of the sheet metal extends from a body edge of the first flat part to a body edge of the second flat part forming a first link, wherein the first link is dimensioned to keep a first contact surface of the first flat part and a second contact surface of the second flat part in intimate contact.

14 Claims, 5 Drawing Sheets

(56) References Cited

U.S. PATENT DOCUMENTS

| | | | | |
|---|---|---|---|---|
| 2012/0121966 A1* | 5/2012 | Kim | .................. | H01M 2/06 |
| | | | | 429/158 |
| 2013/0000957 A1 | 1/2013 | Ikeda et al. | | |
| 2013/0216895 A1* | 8/2013 | Fritz | ................ | H01M 2/202 |
| | | | | 429/158 |
| 2013/0302663 A1* | 11/2013 | Teramoto | ............. | H01M 2/202 |
| | | | | 429/160 |
| 2014/0069690 A1 | 3/2014 | Diez et al. | | |

\* cited by examiner

ELECTRICAL BUS BAR

CROSS-REFERENCE TO RELATED APPLICATION

This application claims the benefit under 35 U.S.C. § 119(a) of Patent Application No. 17207129.2 filed in the European Patent Office on Dec. 13, 2017, the entire disclosure of which is hereby incorporated by reference.

TECHNICAL FIELD OF THE INVENTION

The invention relates to an electrical bus bar for high current application in electrical driven vehicles or hybrid vehicles. Furthermore, the invention relates to a method for manufacturing the electrical bus bar.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

An electrical bus bar including a first mounting portion configured to be connected to a first counter connector, a second mounting portion configured to be connected to a second counter connector and a flexible section between the first and second mounting portions is presented herein. The bus bar includes a first flat part and a second flat part. Each flat part extends from the first mounting portion to the second mounting portion and is arranged in a stacked configuration. The first flat part and the second flat part is made of a sheet metal. A first strip of the sheet metal extends from a body edge of the first flat part to a body edge of the second flat part forming a first link. The first link is dimensioned to keep a first contact surface of the first flat part and a second contact surface of the second flat part in intimate contact. The first flat part includes an arm protruding from the first contact surface and located in the flexible section. The second flat part includes an opening located in the flexible section. The arm is formed to protrude into the opening, thereby limiting movement of the first flat part in relation to the second flat part.

The bus bar described herein combines the advantages inflexibility of electrical bus bars having a high number of electric conductive layers with the high current properties of bus bars made of solid material. In some high current application, the tolerance, that has to be considered is e.g. in the range of 1 to 3 mm. The flexibility that is needed while assembling the bus bar in the vehicle is quite low. A bus bar made of three solid parts arranged parallel to each other provide little flexibility while assembling the bus bar. The solid flat parts are able to move very little in relation to each other. This little movement provides little flexibility. After assembling, the solid parts, in combination, provide the ability to carry high currents. The solid flat parts are linked with a metal strip, extending from the edges, that keeps the flat parts in a stacked configuration. The link has a length that allows movement of the flat parts. The link acts as a hinge that allows folding of the linked flat parts. When the parts are arranged with the contact surfaces contacting each other, the link prevents movement that separate the contact surfaces. The links are preferably attached in the mounting portions. This allows the electrical bus bar to be handled easily. The arm protrudes into the opening and prevents movement of the flat parts in relation to each other. If more flexibility is desired, the opening can be designed slightly bigger than the cross-section of the arm. This reduces movement of the arm inside the opening. Hence, the flat parts can move a little bit more in relation to each other.

The present application also discloses a method for manufacturing a multi-part electrical bus bar as described above. The method includes the steps of:
providing sheet metal and a tooled stamping machine;
inserting the sheet metal into the stamping machine;
stamping the second flat part and the first flat part attached to a carrier strip from the sheet metal using the stamping machine, thereby forming the arm and the opening;
folding the first flat part and second flat part to a stacked configuration, wherein the first link limits the movement of the first flat part and second flat part; and
removing the first flat part from the carrier strip.

The method produces an electrical bus bar using one stamping machine and one sheet metal. The method provides also the advantage to be flexible concerning the number of flat parts that are stacked to get the electrical bus bar.

Preferably, the arm protrudes through the opening. An arm end is in contact to a third contact surface of the second flat part opposite to the second contact surface to keep the first contact surface of the first flat part and the second contact surface of the second flat part in intimate contact. The intimate contact reduces the electrical resistance of the electrical bus bar because the bus bar acts as a solid part. On the other hand, the flat parts can move little in relation to each other, when forced while assembly into the vehicle.

Advantageously, the electrical bus bar is made of one piece of sheet metal. This reduces the costs for manufacturing the electrical bus bar.

Preferably, all contact surfaces are plated with tin. A combination of a tin plating for the bus bar and silver for a terminal works well in practice. The contact surfaces can be plated to prevent corrosion or to reduce electrical resistance.

Advantageously, the electrical bus bar has an elongated shape aligned along a longitudinal axis. The first link is attached to the body edges of the first flat part and the second flat part at a positions where the body edges are substantially parallel to the longitudinal axis. This embodiment enables the usage of very easy design for the first link. The link has to be just a straight strip of the sheet metal.

Preferably, the electrical bus bar includes a third flat part, extending from the first mounting portion to the second mounting portion, made of the sheet metal and arranged to the stacked configuration. A second strip of the sheet metal extends from a body edge of the first flat part to a body edge of the third flat part forming a second link. The third flat part includes a forth contact surface that is in intimate contact with the third contact surface. The additional flat part improves, dependent on the requirements and dimensions, the electrical resistance or the flexibility.

Preferably the first link and the second link are attached to the body edges at positions where the body edges are parallel to the longitudinal axis. This embodiment enables the usage of a very easy design for the first and second link. The links have to be just straight strips of the sheet metal.

In one embodiment, the second link is attached to the body edge of the first flat part and to the body edge of the third flat part at positions where the body edges are substantially parallel to the longitudinal axis. The first link and the second link are arranged on positions opposite to each other along a transversal axis and perpendicular to the longitudinal axis. The opposition of the two links provides a stable fixation of the flat parts. The contact surfaces are kept in intimidate contact.

Preferably, the extension of the first link is smaller than the extension of the second link. The first link is configured to hold the first and second flat part, that are closer to each other, in position The second link is configured to hold the first and third flat part, that have a distance to each other because the second flat part is in between, in position.

Advantageously, the third flat part includes a second opening located in the flexible section. The arm is formed to protrude into the second opening, thereby limiting movement of the first flat part in relation to the second flat part and the third flat part. The arm protrudes into the opening and prevents movement of the flat parts in relation to each other. If more flexibility is requested, the opening can be designed slightly bigger than the cross-sectional of the arm. This provides little movement of the arm inside the opening. Hence, the flat parts can move a little bit more in relation to each other.

Preferably, the arm protrudes through the second opening. The arm end is in contact to a fifth contact surface of the third flat part opposite to the fourth contact surface to keep the first contact surface of the first flat part and the second contact surface of the second flat part, furthermore the third contact surface of the second flat part and the fourth contact surface of the third flat part in intimate contact. The intimate contact reduces the electrical resistance of the electrical bus bar because the bus bar acts as a solid part. On the other hand, the flat parts can move little in relation to each other, when forced while assembly into the vehicle.

In one embodiment, the first mounting portion includes a first connecting opening and the second mounting portion includes a second connecting opening. The openings receive bolts of high-power devises. The bolts are connected to the mounting portions by screw connections. The screw connections press the flat parts against each other and reduce this way the electrical resistance of the electrical bus bar.

Advantageously, the first connecting opening or the second connecting opening is equipped with an electrical terminal. The electrical terminal is pressed in the connector opening, thereby mechanically connecting the flat parts. The press-fit connection also provides a low resistant electrical connection between the flat parts and the electrical terminal.

Figure 1:
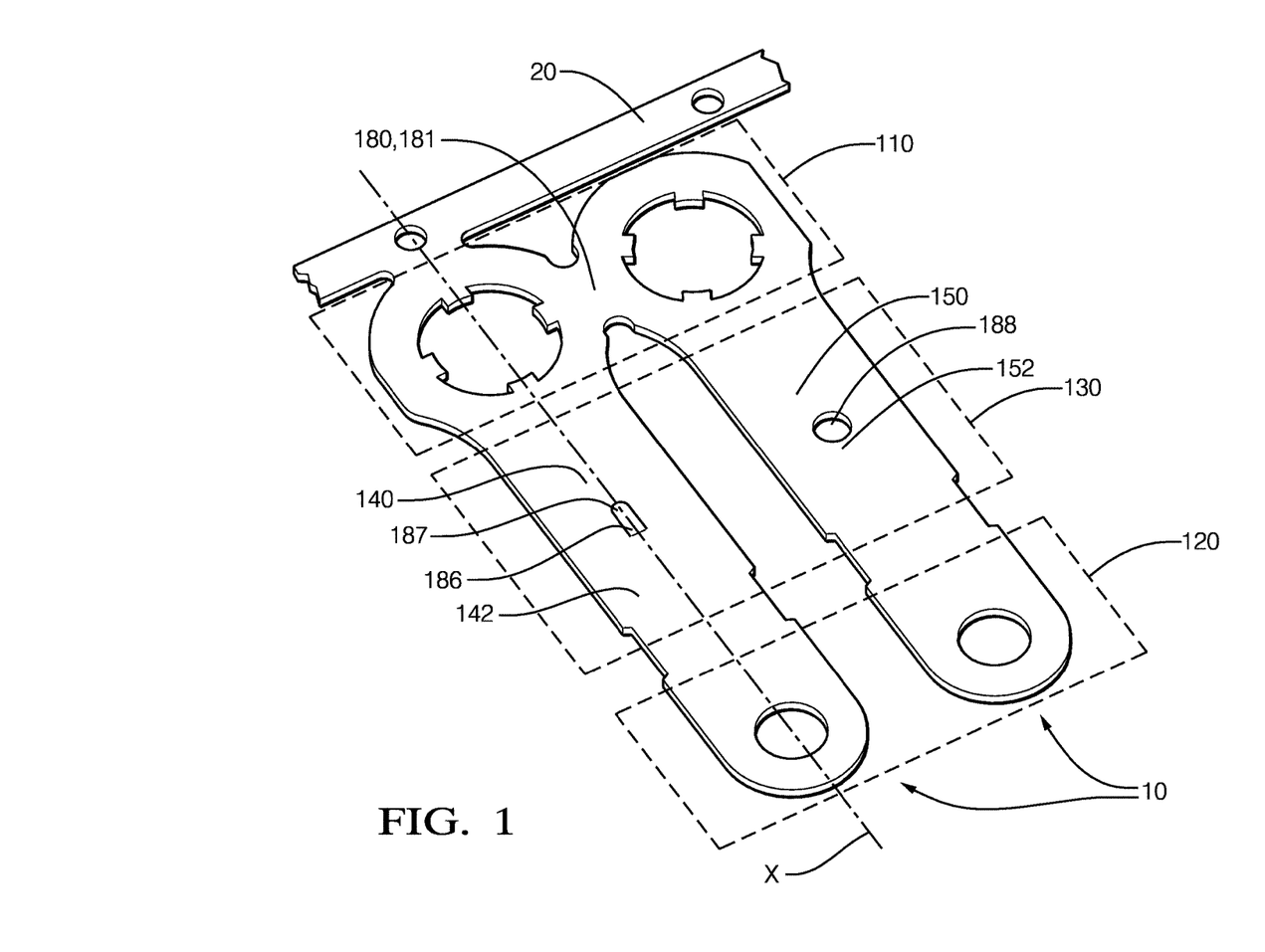
FIG. 1 is a perspective view of a preassembled two-part electrical bus bar attached on a carrier strip according to an embodiment of the invention.
Figure 5:
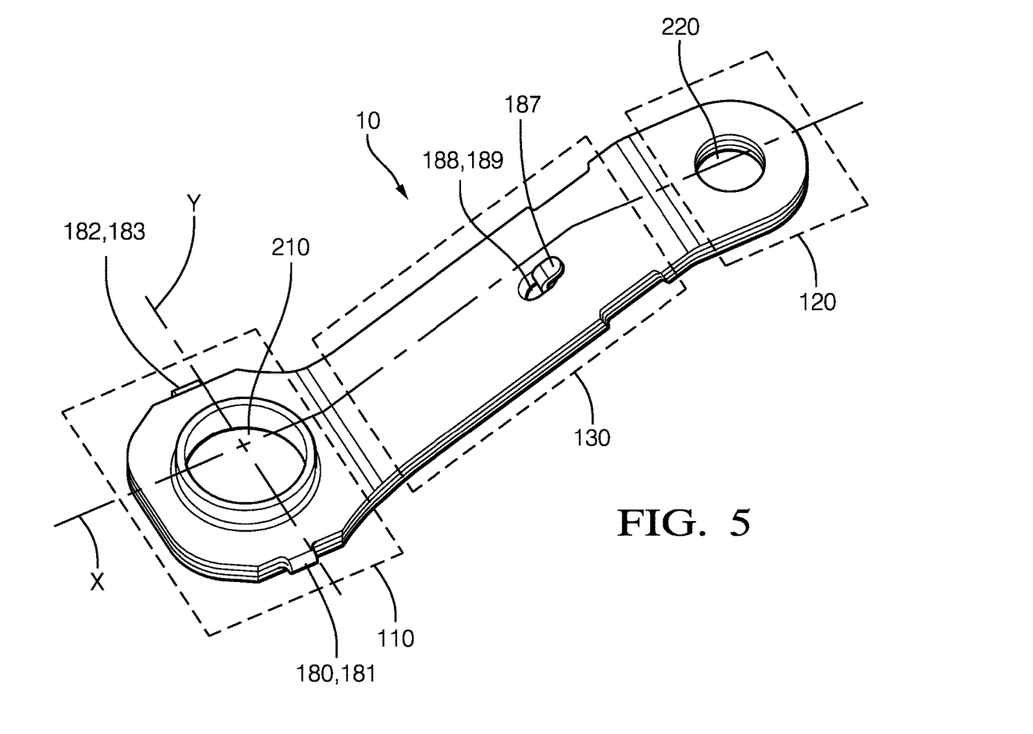
FIG. 5 is a perspective view of a three-part electrical bus bar according to an embodiment of the invention.

FIG. 1 shows a perspective view of a preassembled two-part electrical bus bar 10 attached on a carrier strip 20. The bus bar 10 includes a first mounting portion 110 configured to be connected to a first counter connector, a second mounting portion 120 configured to be connected to a second counter connector and a flexible section 130 between the first and second mounting portions 110, 120. The bus bar 10 includes a first flat part 140 and a second flat part 150. The first and second flat parts 140, 150 extend from the first mounting portion 110 to the second mounting portion 120 and is arranged in a stacked configuration when the bus bar 10 is finalized, by folding the two flat parts. The first flat part 140 and the second flat part 150 is made of a sheet metal 30. A first strip 180 of the sheet metal 30 extends from a body edge of the first flat part 140 to a body edge of the second flat part 150 forming a first link 181. The first link 181 is dimensioned to keep a first contact surface 142 of the first flat part 140 and a second contact surface 152 of the second flat part 150 in intimate contact, in the stacked configuration (see FIG. 5). The first flat part 140 includes an arm 186, protruding from the first contact surface 142, located in the flexible section 130. The second flat part 150 includes a first opening 188 located in the flexible section 130. The arm 186 is also made from the sheet metal 30, e.g. by stamping. The arm 186 is formed to protrude into the opening, thereby limiting movement of the first flat part 140 in relation to the second flat part 150. The arm 186 protrudes through the first opening 188. An arm end 187 is in contact to a third contact surface 154 of the second flat part 150 opposite to the second contact surface 152 to keep the first contact surface 142 of the first flat part 140 and the second contact surface 152 of the second flat part 150 in intimate contact. The cooperation of the first and second flat parts 140, 150 is also shown in FIG. 5. The bus bar 10 has an elongated shape aligned along a longitudinal axis X. The first link 181 is attached to the body edges of the first flat part 140 and the second flat part 150 at a positions where the body edges are substantially parallel to the longitudinal axis X.

Figure 2:
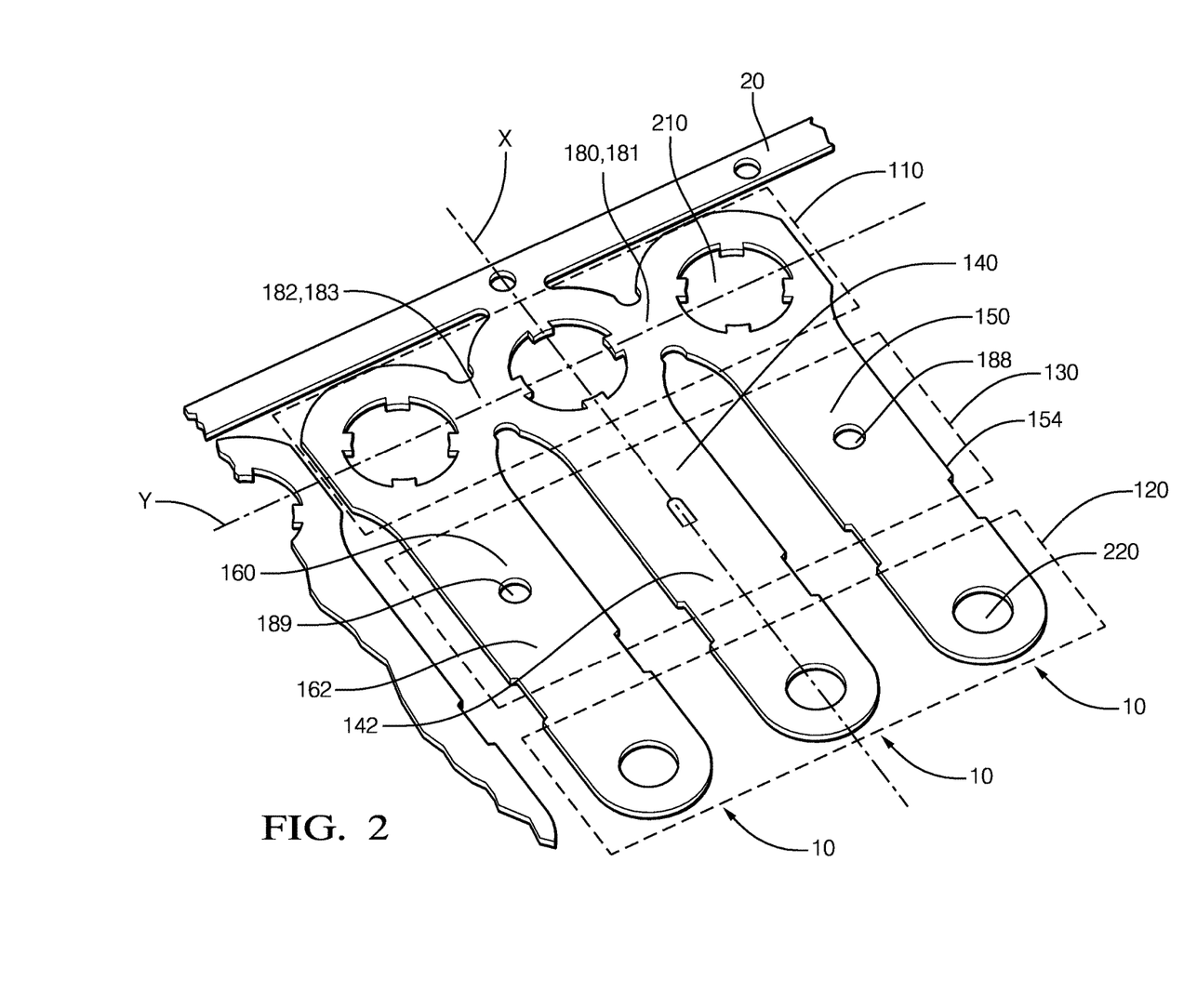
FIG. 2 is a perspective view of a preassembled three-part electrical bus bar attached on a carrier strip according to an embodiment of the invention.

FIG. 2 shows a perspective view of a preassembled three-part electrical bus bar 10 attached on a carrier strip 20. The bus bar 10 includes a third flat part 160, extending from the first mounting portion 110 to the second mounting portion 120, made of the sheet metal 30 and arranged to the stacked configuration (when finalized of the first flat part 140 and the second flat part 150. A second strip 182 of the sheet metal 30 extends from a body edge of the first flat part 140 to a body edge of the third flat part 160 forming a second link 183. The third flat part 160 includes a forth contact surface 162 that is in intimate contact with the third contact surface 154. The cooperation of the first, second, and third flat parts 140, 150, 160 is shown in FIG. 5. The first link 181 and the second link 183 are attached to the body edges at positions where the body edges are parallel to the longitudinal axis X. The second link 183 is attached to the body edge of the first flat part 140 and to the body edge of the third flat part 160 at positions where the body edges are substantially parallel to the longitudinal axis X. The first link 181 and the second link 183 are arranged on positions, opposite to each other, along a transversal axis Y, perpendicular to the longitudinal axis X. The extension of the first link 181 is smaller than the extension of the second link 183. The third flat part 160 includes a second opening 189 located in the flexible section 130. The arm 186 is formed to protrude into the second opening 189, thereby limiting movement of the first flat part 140 in relation to the second flat part 150 and the third flat part 160.

Figure 3:
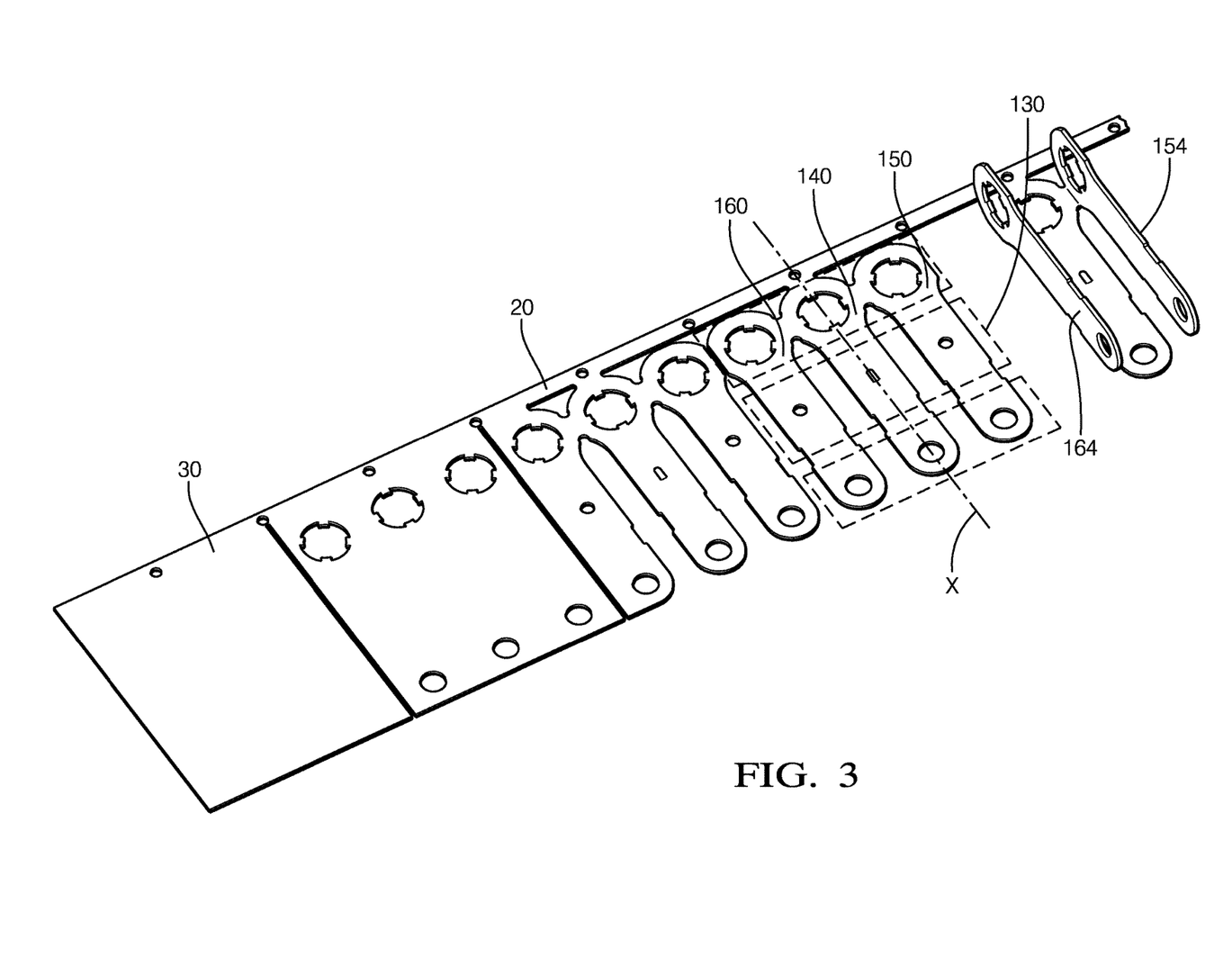
FIG. 3 is a perspective view of a preassembled three-part electrical bus bar while manufacturing according to an embodiment of the invention.
Figure 4:
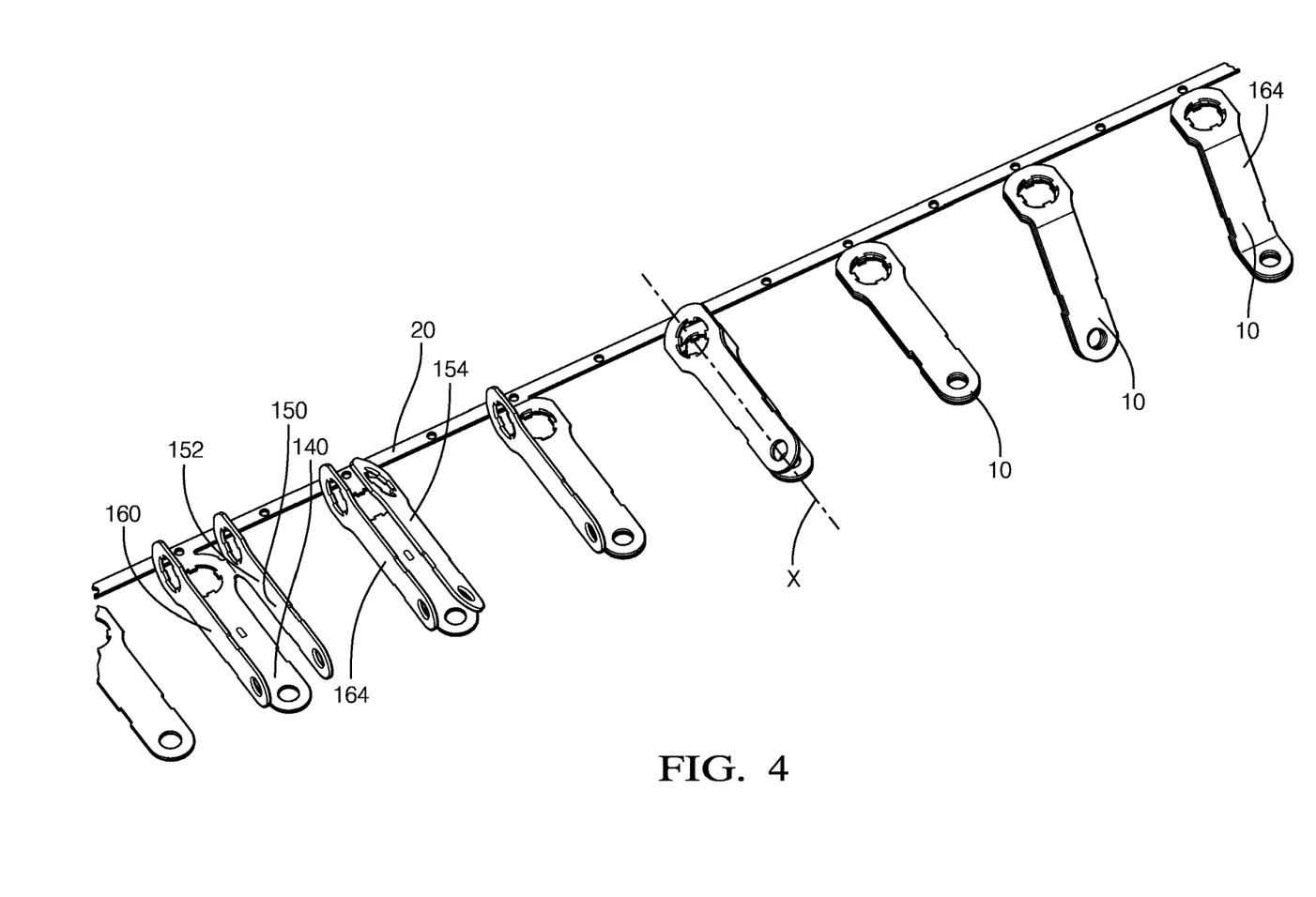
FIG. 4 is a perspective view of a preassembled three-part electrical bus bar while manufacturing according to an embodiment of the invention.

FIG. 3 and FIG. 4 show perspective views of a preassembled three-part electrical bus bar 10 while manufacturing. The bus bar 10 is made of one piece of sheet metal 30. The first, second, and third contact surfaces 142, 152, 154 can be plated with tin. Until finalization, the flat parts are attached to the carrier strip 20. In a first production step, the three flat parts are stamped from the sheet metal 30. Only the first flat part 140 stays connected to the carrier strip 20. In the next step, the second flat part 150 is folded towards the first flat part 140 using the first link 181 as a hinge until the second flat part 150 touches the first flat part 140. Then, the third flat part 160 is folded towards the second flat part 150 using the second link 183 as a hinge until the third flat part 160 touches the second flat part 150. The arm 186 protrudes through the first opening 188 and the second opening 189. Finally the arm end 187 is the formed to touch the fifth contact surface 164. It may be necessary to deform the finally assembled bus bar 10 along the longitudinal axis X to fulfill the set requirements.

FIG. 5 shows a perspective view of a three-part electrical bus bar 10. The first, second, and third flat parts 140, 150, 150 are arranged in the stacked configuration. The first link 181 and the second link 183 are attached to the body edges at positions where the body edges are parallel to the longitudinal axis X. The second link 183 is attached to the body edge of the first flat part 140 and to the body edge of the third flat part 160 at positions where the body edges are parallel to the longitudinal axis X. The first link 181 and the second link 183 are arranged on positions, opposite to each other, along a transversal axis Y, perpendicular to the longitudinal axis X. The arm 186 protrudes through the second opening 189. The arm end 187 is in contact to a fifth contact surface 164 of the third flat part 160 opposite to the fourth contact surface 162 to keep the first contact surface 142 of the first flat part 140 and the second contact surface 152 of the second flat part 150, furthermore the third contact surface 154 of the second flat part 150 and the fourth contact surface 162 of the third flat part 160 in intimate contact. The first mounting portion 110 includes a first connecting opening 210 and the second mounting portion 120 includes a second connecting opening 220.

Figure 6:
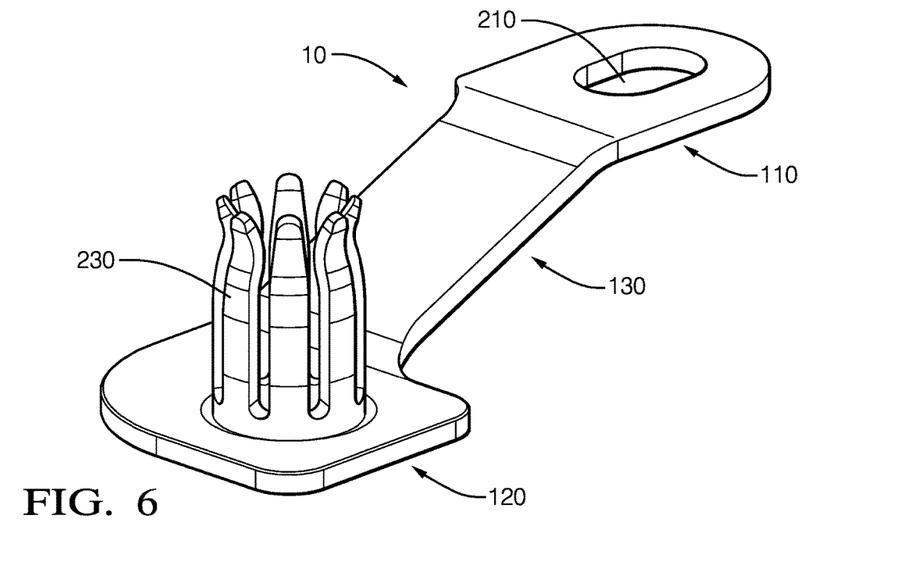
FIG. 6 is a perspective view of a three-part electrical bus bar equipped with an electrical terminal according to an embodiment of the invention.

FIG. 6 shows a perspective view of a three-part electrical bus bar 10 equipped with an electrical terminal 230. In this embodiment the second connecting opening 220 is equipped with the electrical terminal 230.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. An electrical bus bar, comprising:
   a first mounting portion configured to be connected to a first counter connector;
   a second mounting portion configured to be connected to a second counter connector;
   a flexible section between the first and second mounting portions;
   a first flat part; and
   a second flat part, wherein the first flat part and the second flat part each extend from the first mounting portion to the second mounting portion and are arranged in a stacked configuration, wherein the first flat part and the second flat part are made of sheet metal, wherein a first strip of the sheet metal extends from a body edge of the first flat part to a body edge of the second flat part forming a first link, wherein the first link is dimensioned to keep a first contact surface of the first flat part and a second contact surface of the second flat part in intimate contact, wherein the first flat part comprises an arm protruding from the first contact surface located in the flexible section, wherein the second flat part comprises an opening located in the flexible section, and wherein the arm is formed to protrude into the opening, thereby limiting movement of the first flat part in relation to the second flat part.

2. The electrical bus bar according to the claim 1, wherein the arm protrudes through the opening and wherein an arm end is in contact to a third contact surface of the second flat part opposite to the second contact surface to keep the first contact surface of the first flat part and the second contact surface of the second flat part in intimate contact.

3. The electrical bus bar according to the claim 2, wherein the electrical bus bar comprises a third flat part, extending from the first mounting portion to the second mounting portion, made of the sheet metal and arranged to the stacked configuration, wherein a second strip of the sheet metal extends from the body edge of the first flat part to a body edge of the third flat part forming a second link, wherein the third flat part comprises a forth contact surface that is in intimate contact with the third contact surface.

4. The electrical bus bar according to the claim 3, wherein the first link and the second link are attached to the body edges at positions where the body edges are parallel to a longitudinal axis.

5. The electrical bus bar according to the claim 4, wherein the second link is attached to the body edge of the first flat part and to the body edge of the third flat part at positions where the body edges are substantially parallel to the longitudinal axis and wherein the first link and the second link are arranged on positions, opposite to each other, along a transversal axis, perpendicular to the longitudinal axis.

6. The electrical bus bar according to the claim 4, wherein an extension of the first link is smaller than an extension of the second link.

7. The electrical bus bar according to the claim 4, wherein the third flat part comprises a second opening located in the flexible section, wherein the arm is formed to protrude into the second opening, thereby limiting movement of the first flat part in relation to the second flat part and the third flat part.

8. The electrical bus bar according to the claim 7, wherein the arm protrudes through the second opening and wherein the arm end is in contact to a fifth contact surface of the third flat part opposite to a fourth contact surface to keep the first contact surface of the first flat part and the second contact surface of the second flat part, furthermore the third contact surface of the second flat part and the fourth contact surface of the third flat part in intimate contact.

9. The electrical bus bar according to the claim 1, wherein the electrical bus bar is made of one piece of sheet metal.

10. The electrical bus bar according to the claim 1, wherein all contact surfaces are plated with tin.

11. The electrical bus bar according to the claim 1, wherein the electrical bus bar has an elongated shape aligned along a longitudinal axis, wherein the first link is attached to the body edges of the first flat part and the second flat part at a positions where the body edges are substantially parallel to the longitudinal axis.

12. The electrical bus bar according to the claim 1, wherein the first mounting portion comprises a first connecting opening and the second mounting portion comprises a second connecting opening.

13. The electrical bus bar according to the claim 12, wherein the first connecting opening or the second connecting opening is equipped with an electrical terminal.

14. A method for manufacturing a multi-part electrical bus bar having a first mounting portion configured to be connected to a first counter connector, a second mounting portion configured to be connected to a second counter connector, a flexible section between the first and second mounting portions, a first flat part, and a second flat part, wherein the first flat part and the second flat part each extend from the first mounting portion to the second mounting portion and are arranged in a stacked configuration, wherein the first flat part and the second flat part are made of sheet metal, wherein a first strip of the sheet metal extends from a body edge of the first flat part to a body edge of the second flat part forming a first link, wherein the first link is dimensioned to keep a first contact surface of the first flat part and a second contact surface of the second flat part in intimate contact, wherein the first flat part comprises an arm protruding from the first contact surface located in the flexible section, wherein the second flat part comprises an opening located in the flexible section, and wherein the arm is formed to protrude into the opening, thereby limiting movement of the first flat part in relation to the second flat part, said method comprising the steps of:
  a) providing the sheet metal and a tooled stamping machine;
  b) inserting the sheet metal into the stamping machine;
  c) stamping the second flat part and the first flat part attached to a carrier strip from the sheet metal using the stamping machine, thereby forming the arm and the opening;
  d) folding the first flat part and second flat part to a stacked configuration, wherein the first link limits the movement of the first flat part and second flat part; and
  e) removing the first flat part from the carrier strip.

* * * * *